(12) United States Patent
Knüsel

(10) Patent No.: US 11,756,456 B2
(45) Date of Patent: Sep. 12, 2023

(54) CLIPBOARD FOR DIGITALIZING INFORMATION

(71) Applicant: TRIHOW AG, Zug (CH)

(72) Inventor: Beat Knüsel, Immensee (CH)

(73) Assignee: TRIHOW AG, Zug (CH)

( * ) Notice: Subject to any disclaimer, the term of this patent is extended or adjusted under 35 U.S.C. 154(b) by 0 days.

(21) Appl. No.: 17/295,951

(22) PCT Filed: Nov. 19, 2019

(86) PCT No.: PCT/EP2019/081768
§ 371 (c)(1),
(2) Date: May 21, 2021

(87) PCT Pub. No.: WO2020/104443
PCT Pub. Date: May 28, 2020

(65) Prior Publication Data
US 2021/0398460 A1    Dec. 23, 2021

(30) Foreign Application Priority Data

Nov. 22, 2018 (CH) .................................. 01445/18

(51) Int. Cl.
*G09F 7/04* (2006.01)
*G06K 7/10* (2006.01)
*G09F 1/10* (2006.01)

(52) U.S. Cl.
CPC ........... *G09F 7/04* (2013.01); *G06K 7/10336* (2013.01); *G06K 7/10376* (2013.01); *G09F 1/10* (2013.01)

(58) Field of Classification Search
CPC ......... G09F 1/10; G09F 7/04; G06K 7/10376; G06K 7/10336; G06Q 10/06
See application file for complete search history.

(56) References Cited

U.S. PATENT DOCUMENTS 4,229,726 A * 10/1980 Deaton ................ G08G 1/012
377/9
5,250,789 A * 10/1993 Johnsen ............... B62B 3/1424
705/14.4
(Continued)

FOREIGN PATENT DOCUMENTS

DE           3148885 A1      6/1983

OTHER PUBLICATIONS

Written Opinion dated Apr. 17, 2020 for PCT/EP2019/081768, filed Nov. 19, 2019 (English translation).
(Continued)

*Primary Examiner* — David R Dunn
*Assistant Examiner* — Christopher E Veraa
(74) *Attorney, Agent, or Firm* — Paul D. Bianco; Katharine Davis Wong; Fleit Intellectual Property Law

(57) ABSTRACT

A clipboard is realised as a base for a sheet of paper and with a fastening therefor, with the base provided with at least one RFID transponder. It comprises a marking on the base, which indicates, where exactly the paper is to be placed, as well as at least one sheet of paper with a RFID transponder, wherein a RFID transponder each of the base and of the paper are arranged so as to be close to each other for communication, when the sheet of paper is fixed to the fastening. The base includes a plurality of switches, which are preferably arranged in a matrix, whereas the sheet is provided with various information, instructions and/or choice variants as well as with a number of marking fields, which are respectively arranged at the locations of the switches of the clipboard, when the sheet is fastened on the marking of the base.

20 Claims, 4 Drawing Sheets

(56) References Cited

U.S. PATENT DOCUMENTS

| | | | |
|---|---|---|---|
| 5,295,342 A | | 3/1994 | Roche |
| 5,389,945 A * | | 2/1995 | Sheridon ................ G09F 9/372 |
| | | | 345/84 |
| 6,462,733 B1 * | | 10/2002 | Murakami ............. G06F 3/033 |
| | | | 345/184 |
| 6,600,482 B1 * | | 7/2003 | Leone, Jr. .......... G06V 30/1423 |
| | | | 345/179 |
| 6,697,056 B1 * | | 2/2004 | Bergelson .......... G06V 30/1423 |
| | | | 345/178 |
| 6,710,791 B1 * | | 3/2004 | Kodama ............. G07G 1/0081 |
| | | | 715/201 |
| 7,198,341 B1 * | | 4/2007 | Rast .......................... G09F 3/00 |
| | | | 347/4 |
| 8,228,299 B1 * | | 7/2012 | Maloney .......... G06Q 20/40145 |
| | | | 345/173 |
| 8,591,055 B2 * | | 11/2013 | Leanza ................. B42F 9/004 |
| | | | 40/124.02 |
| 2004/0032428 A1 * | | 2/2004 | Pilu ....................... G06F 16/955 |
| | | | 715/764 |
| 2006/0007189 A1 * | | 1/2006 | Gaines, III ......... G06V 30/1423 |
| | | | 382/187 |
| 2007/0176780 A1 | | 8/2007 | Hart |
| 2011/0137671 A1 * | | 6/2011 | Scarola .................. G16H 40/67 |
| | | | 705/2 |
| 2011/0252946 A1 | | 10/2011 | Armstrong |
| 2012/0162127 A1 * | | 6/2012 | Onoda ................ G06F 3/04883 |
| | | | 345/174 |
| 2013/0021261 A1 * | | 1/2013 | Wilson .................. G09G 5/003 |
| | | | 345/1.3 |
| 2016/0116976 A1 * | | 4/2016 | Russell ................ G06F 3/0202 |
| | | | 340/10.5 |
| 2016/0300089 A1 | | 10/2016 | Arsenault |
| 2016/0343264 A1 | | 11/2016 | Murdock |
| 2018/0136781 A1 * | | 5/2018 | Fujioka ................. G06F 3/0442 |
| 2020/0356254 A1 * | | 11/2020 | Missig ................... G06T 13/80 |

OTHER PUBLICATIONS

Mikko Pyykkönen et al. "Activity pad: teaching tool combining tangible interaction and affordance of paper" Proceedings of The 2013 ACM International Conference on Interactive Tabletops and Surfaces, ITS '13, Jan. 1, 2013, pp. 135-144.

International Search Report (dated Apr. 2, 2020) and Written Opinion for PCT/EP2019/081768, filed Nov. 19, 2019.

* cited by examiner

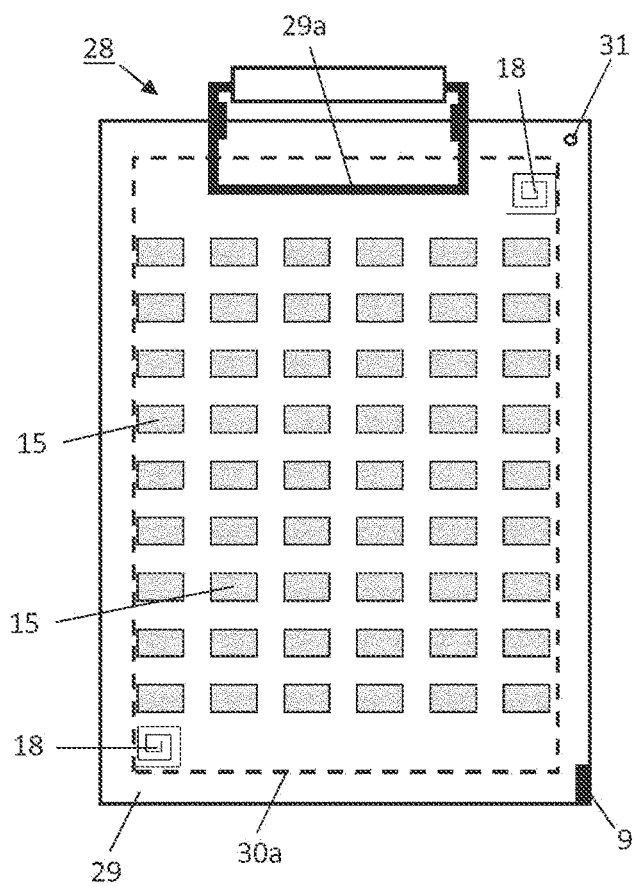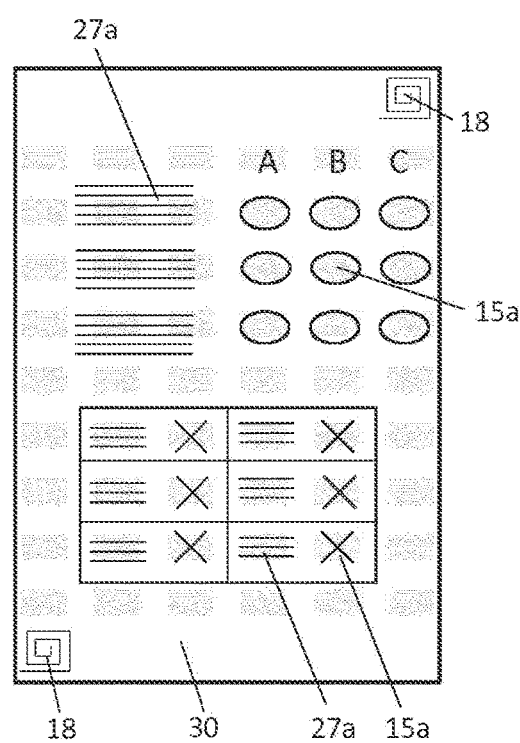
Fig. 10A
Fig. 10B

US 11,756,456 B2

CLIPBOARD FOR DIGITALIZING INFORMATION

TECHNICAL FIELD

The invention relates to a clipboard realised as a base for a sheet of paper and a fastening therefor, wherein the base is provided with at least one, preferably two RFID transponders, as well as at least one sheet of paper with a RFID transponder, wherein a RFID transponder each of the base and of the paper are arranged so as to be close to each other for communication, when the sheet of paper is fixed to the fastening.

STATE OF THE ART

Work surfaces used by workshops are for example whiteboards, pinwalls, blackboards or tables. Participants for example note down their ideas on pieces of paper and attach them to these conventional work surfaces such as whiteboards or pinwalls, so that all can see them. Subsequently evaluation is performed, duplicate ideas are removed, similar ones are pooled, important ones are embellished with further ideas. Depending on the purpose of the workshop sequences are determined and/or priorities are set and finally tasks and responsibilities are assigned.

Such workshops are frequently accompanied by facilitators, equipped with facilitator's cases, which are well equipped with self-adhesive post-its of different colours and shapes, coloured dots, magnetic buttons, markers, scissors, pins etc. The work results can at best, be recorded photographically. Following completion however, they are not used any further, the work surface is again emptied.

On the other hand electronic whiteboards, here called smartboards, are known, which are equipped with electronics for performing various additional functions. There are known to be boards, which like a tablet comprise a touchscreen, character recognition and so on. These allow previously produced graphics to be supplemented by handwritten remarks and to be stored in amended form. Such smartboards are however very expensive and cannot, in contrast to a facilitator's case, be simply brought along by a facilitator.

SUMMARY OF THE INVENTION

It is the objective of the present invention to describe a clipboard of the kind mentioned in the beginning for digitising workshop results, which is portable and which can send work results in digitised form to a computer for the computer to further process them.

The invention is solved by the characteristics of the first patent claim. According to the invention the clipboard comprises a marking on the base, which indicates, where exactly the paper is to be placed, as well as a plurality of switches on the base, which are preferably arranged in a matrix, whereas the sheet is provided with various information, instructions and/or choice variants as well as with a number of marking fields, which are respectively arranged at the locations of the switches of the clipboard, when the sheet is fastened on the marking of the base.

BRIEF DESCRIPTION OF THE DRAWINGS

The invention is illustrated below in various drawings and explained in more detail with the aid of reference symbols explained further below, in which:

FIGS. 10A, 10B show a schematic view of an inventive clipboard (FIG. 10A) and a suitable sheet of paper (FIG. 10B).

WAYS OF IMPLEMENTING THE INVENTION

Figures 1A, 1B:
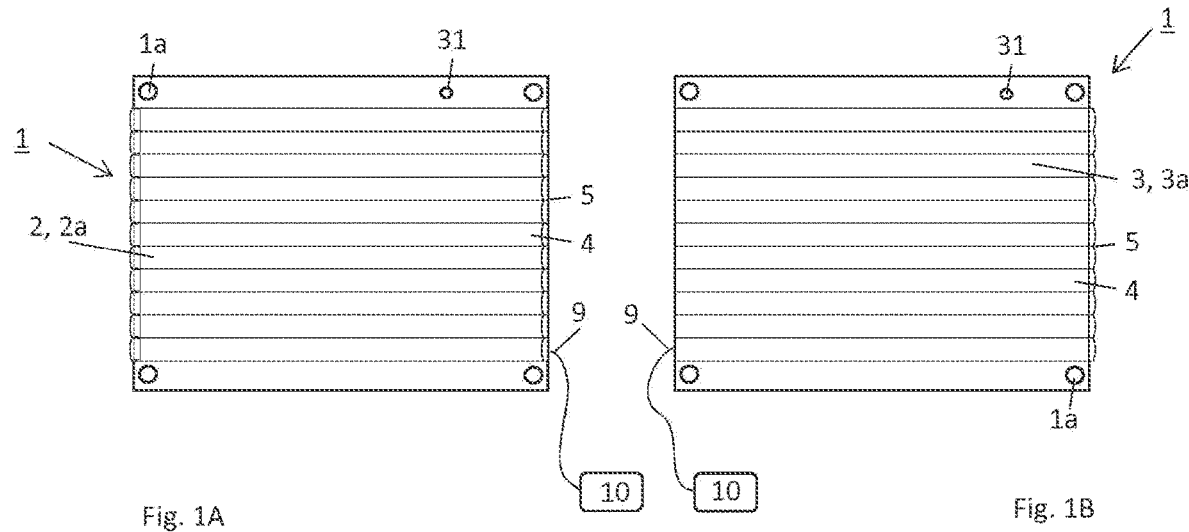
FIG. 1A, 1B shows a schematic depiction of an inventive smartboard connected to a computer with a view onto the first surface (FIG. 1A) and onto the second surface (FIG. 1B)

FIGS. 1A and 1B each show a smartboard 1 for digitising workshop results, including a first surface 2 and a second surface 3, which are designed parallel to one another.

Such a smartboard 1 can be placed either on a table or hung from a wall or a conventional whiteboard, wherein this can be accomplished by means of eyelets 1a provided on the smartboard 1. Working with the smartboard 1 is possible horizontally or vertically.

Figure 2:
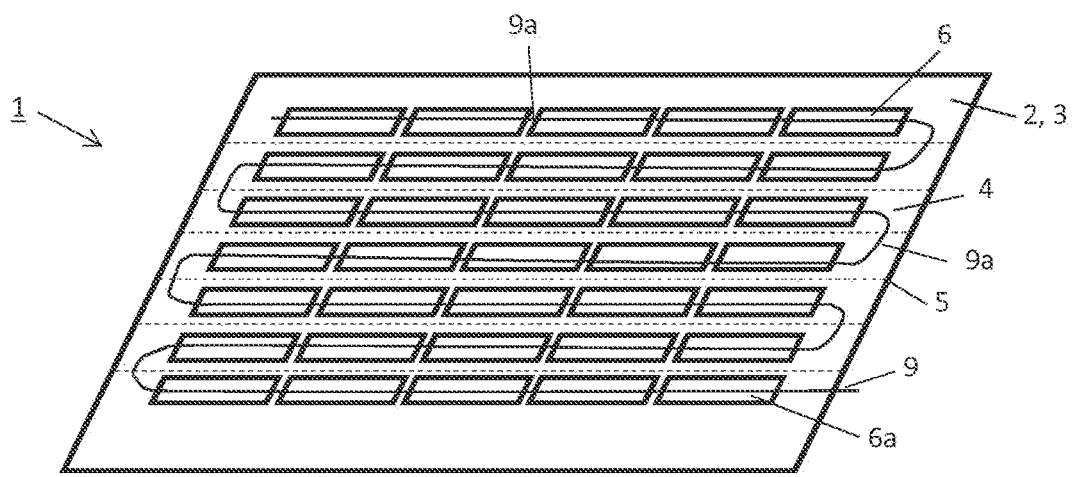
FIG. 2 shows a schematic internal view of such a smartboard.
Figure 3A:
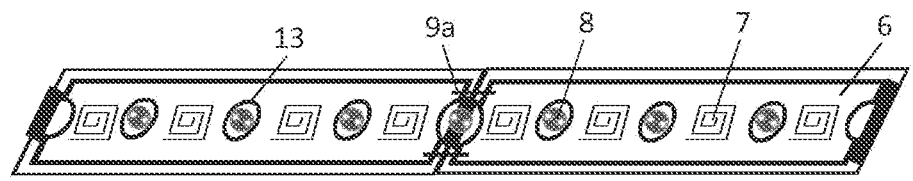
FIGS. 3A, 3B show a schematic partial view of an internal view of a smartboard in two alternative forms.
Figure 3B:
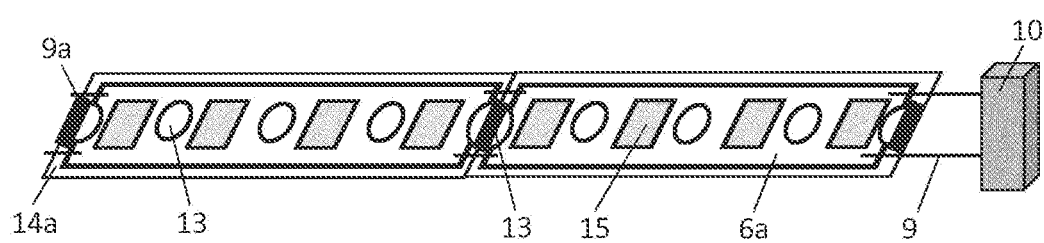
Figure 4:
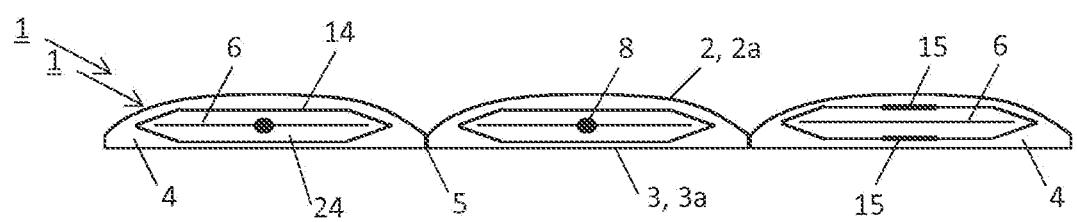
FIG. 4 shows a schematically drawn cross-section through a partial region of a smartboard, at different points.

FIG. 2 shows the inside of such a smartboard 1, FIGS. 3A and 3B show an enlargement of individual segments thereof. Between these surfaces 2, 3 a plurality of pockets 4 are arranged in parallel to one another, which are connected with each other at joints 5. One or more electrically interconnected printplates 6 are arranged in each pocket 4, the printplates including a plurality of NFC receivers 7 in an array. Also, each pocket 4 has arranged in it a plurality of magnets 8 in an array in form of ferromagnets or permanent magnets. They may be mounted in recesses 13 provided in the printplates 6 for this purpose. If permanent magnets, in particular rod-shaped ones, are chosen as magnets 8, it is advantageous if these are mounted in such a way that they are capable of aligning themselves. Preferably the NFC receivers 7 and the magnets 8 are arranged respectively in an alternating manner in the array. As depicted in FIGS. 3A and 3B, printplates 6 within a pocket 4 can for example be plugged into each other at electrical connections 9a, so that they are electronically contacted with each other. FIG. 4 shows a cross-section of individual pockets 4 in the region of the printplates 6 and the magnets 8.

The printplates 6 of adjacent pockets 4 are connected with each other at electronic connections 9a, preferably meanderingly as depicted in FIG. 2. A first of the printplates 6a is provided with a port 9 for the connection to a power supply 10 and for a data output for the purpose of transmitting data for example to a computer 10.

Moreover one or more switches 15, preferably pressure switches, which can be triggered by a user, may be arranged in the pockets 4. In a preferred embodiment each NFC receiver 7 is assigned its own switch 15, as depicted in FIG. 3B. Depending on the construction of the switch 15 it may be designed such that it can be actuated optionally from the first and/or the second surface 2, 3 by a user pressing it, or two switches 15 may be arranged opposite each other, as shown in the right-hand part of FIG. 4. Each switch 15 is also connected to the port 9 for data output.

Figure 5:
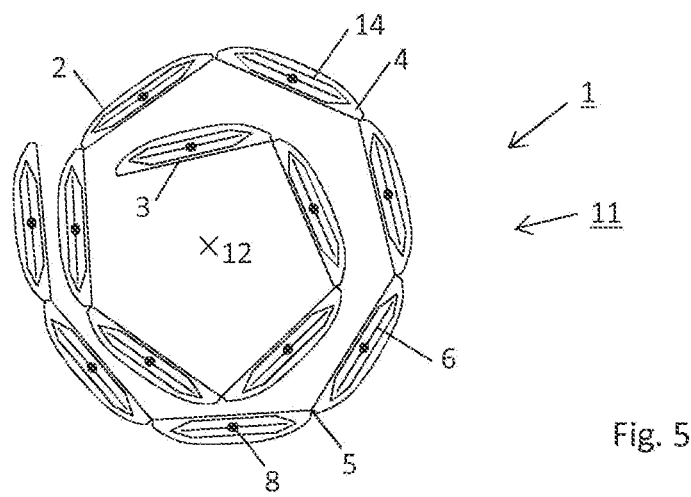
FIG. 5 shows a schematically drawn cross-section through a rolled-up smartboard.

Since the pockets are hingedly connected with each other, the smartboard 1 can be rolled into a roll 11 with an axis 12 parallel to the elongate pockets 4, as shown in FIG. 5. Preferably the pockets 4 comprise pressure-proof housings 14, in which the printplates 6 and the magnets 8 are protectively arranged. Ultimately the switches 15 are attached to these housings 14 so as to be actuated from outside, for example by pressing them.

Preferably at least the first surface 2 consists of a flexible material, in particular a textile material such as a felt mat 2a, so that this surface 2 can be perforated by a pin or a needle. Thus it is easy to write information on a slip of paper and pin it to the smartboard 1.

Alternatively or additionally thereto at least the second surface 3 may consist of a pressure-proof material, preferably of plastic plates 3a. Preferably this is designed to be low-gap when the smartboard 1 is completely unwound. This second surface 3 can be easily written on with wipe-off markers, and self-adhesive post-its can be attached to it. It is also possible to design both surfaces 2, 3 in an identical manner.

Such a smartboard 1 is now suitable for working with. Information can be attached in different ways to the smartboard 1. The described or equipped smartboard 1 can be expanded in a modular manner by further modules 17, 19, 21, 23, 25, 28 described here, which together with the smartboard 1 form a set 16. Each of these modules 17, 19, 21, 23, 25, 28 can however also be used on its own or in connection with other such modules 17, 19, 21, 23, 25, 28 or with components not named here. The purpose shall always be to organise, store and forward information while working as a group or on a project. As a rule a coach would lead and accompany such group work and explain to the participants the method of working with the smartboard 1 and the modules 17, 21, 23, 25, 28.

Thus for example information can be written onto magnetically attached modules 17, 19, 21, 23, 25, which adhere to the magnets 8 in the smartboard 1. The information could also be placed on top of each other, collated into groups, or be organised into a logical sequence. Additional information can also be attached directly to the smartboard 1.

Figure 6:
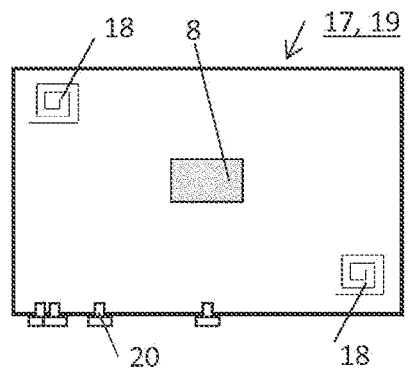
FIG. 6 shows a schematic view of an inventive object in form of a card.
Figure 7:
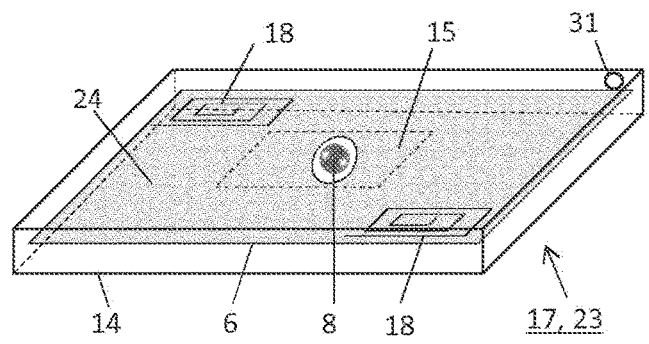
FIG. 7 shows a schematic view of an inventive object in form of a can with an internal space.

A set 16 includes for example a smartboard 1 as well as two or more objects 17 representing modules, as depicted in FIG. 6 or 7. As a rule a plurality of such objects 17 is used. Each of these objects 17 includes at least one magnet 8 in form of a permanent magnet or a ferromagnet as well as at least one, preferably two RFID transponders 18. Optionally the objects 17 may also include a switch 15, in particular a pressure switch.

In a first preferred embodiment as per FIG. 6 one or more of these objects 17 may be realised as cards 19. The cards 19 have for example the size and shape of credit cards or business cards. In a preferred embodiment they comprise a coding 20, for example in form of notches. Such codings 20 can help to separate cards 19, which belong to a group and which all comprise the same coding 20, from other cards 19. To this end the cards 19 are placed into boxes provided for this purpose, which comprise grooves on the bottom, which correspond to the notches 20 of a respective group. Cards 19, which do not belong to this group and therefore have a different coding 20, abut against at least one of the grooves and as a result stand out in relation to the other cards 19, which at these points comprise a notch 20. This allows them to be easily sorted out.

An additional colour coding on the side could for example mark the sequence of the cards 19, if the colour coding of each subsequent card 19 is slightly offset from that of the previous card. This makes it very easy to control the sequence.

As an alternative to the design as a card 19 the objects 17 could be designed as a can 23 with a housing 24 and with an interior space 24, as shown in FIG. 7. A can 23 is easier to grip than a card 19. The interior space 24 of each can 23 may accommodate the one or more RFID transponders 18 and the magnet 8, and a switch 15 may in addition be attached to the can 23. The magnet 8 is preferably realised as a permanent magnet and mounted in the interior space 24 such that it can freely align itself. It is also possible to provide a number of magnets 8. Further suitable electronic components can be arranged on a printplate 6. The can 23 may for example have a LED 31, which gives feedback following actuation of the switch 15. The supply for this can be run via the RFID transponders 18 from the smartboard 1. The cans 23 protect the components arranged in the interior space 24 against the impact of external forces and contamination.

Such objects 17 or cards 19 may already have been written on or be written on whilst working. Thanks to their magnets 8 they adhere to the smartboard 1. Their RFID transponders 18 correspond with the NFC receivers 7. This allows a computer 10 attached to the smartboard 1 to be sent the ID number of the card 19 as well as the position on the smartboard 1, to which it adheres. The card 19 may be assigned further properties, which are stored in a database, which can be accessed by the computer 10. In addition further actions may be initiated, if for example a switch 15 of the smartboard 1 is actuated, before a card 19 is attached thereto. Visual or other information can be retrieved or assignments may be made to the ID number of the respective card 19. For example an assignment may be created such as «the next photo, which is taken by a camera assigned to the smartboard 1, is linked in a database to the ID number of that card 19, which was attached to the switch 15». Thus for example the picture of a person, which shall be appointed as project manager, or a picture of an architectural model, the realisation of which shall take place, may be assigned to a card 19. When actuating the switch 15 again, the corresponding picture can be shown on the display. If a number of cards 19 are arranged one above the other, the corresponding pictures of all these cards 19 are displayed. These are just a few examples. A management system may contain a plurality of presentation programs, which comprise various instructions for work with the smartboard 1 and the different objects 17, 19, 21, 23, 25, 28. Correspondingly a management system may include one or more boxes of cards 19 of different groups, wherein the ID numbers of individual cards 19 have already been recorded in a database and brought into correlation with certain information.

Figure 8A:
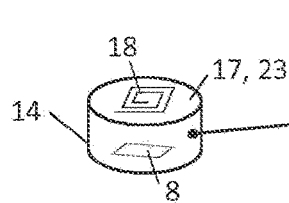
FIGS. 8A, 8B show a schematic view of an inventive connecting element in two embodiments.
Figure 8A:
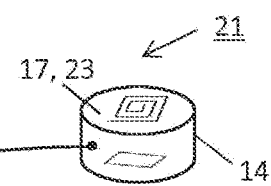

A further set 16 again includes a smartboard 1 and objects 17, as described above. In addition it includes one or more connecting elements 21 depicted in FIGS. 8A and 8B. A connecting element 21 includes two objects 17 connected with each other by a connecting ribbon 22. The connecting ribbon 22 merely represents a visual and structural connection of the objects 17, it may be elastic. The objects 17 may be realised as cards 19 or as cans 23, as shown in FIG. 8A. When the two end points of the connecting ribbon 22 with the magnets 8 of the objects 17 are placed on the smartboard 1, an assignment can be created linking the two places of these end points with one another. This may mean a temporal sequence, a hierarchy, a togetherness or similar. The cans 23 may be realised as described in FIG. 7. In particular they may comprise a housing 14 with an interior space 24.

Figure 8B:
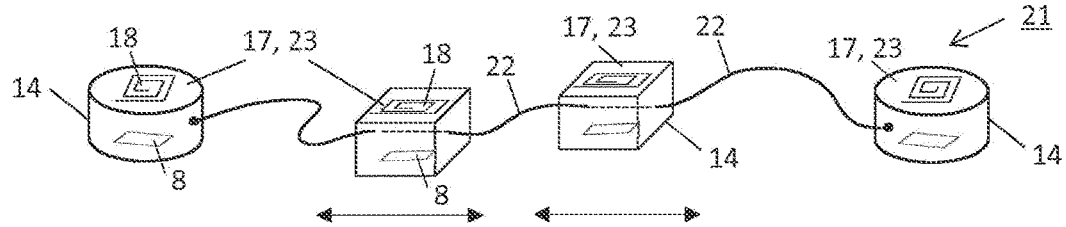

With a preferred embodiment of a connecting element 21, as shown in FIG. 8B, one or two further such objects 17 are movingly attached to the connecting ribbon 22. If only one object 17 has been attached, it may be understood as being a percentage value: a placing of the movable object 17 in the middle between the ends of the connecting ribbon 22 means 50%, a movement by a half to one end 25% or 75% respectively depending on the predefined starting position. The scaling cannot be resolved to a randomly fine value; the placing is detected by the NFC receivers 7 based on the placing of the RFID transponders 18.

If two objects 17 are movably arranged in the connecting ribbon 22 as shown in FIG. 8B, this can be for example interpreted as a region between minimum and maximum, which are respectively defined by the objects 17 at the ends of the connecting ribbon 22. Detection of the positions on the smartboard 1 happens in the same way as with a movable object 17. The connecting elements 21 may optionally be placed directly on the smartboard 1 or on cards 17 if such objects are already arranged on the smartboard 1.

The objects 17 of a connecting element 21 may be optionally realised as card 19 as described in FIG. 6, or as can 23 with an interior space 24 as described in FIG. 7.

Figure 9:
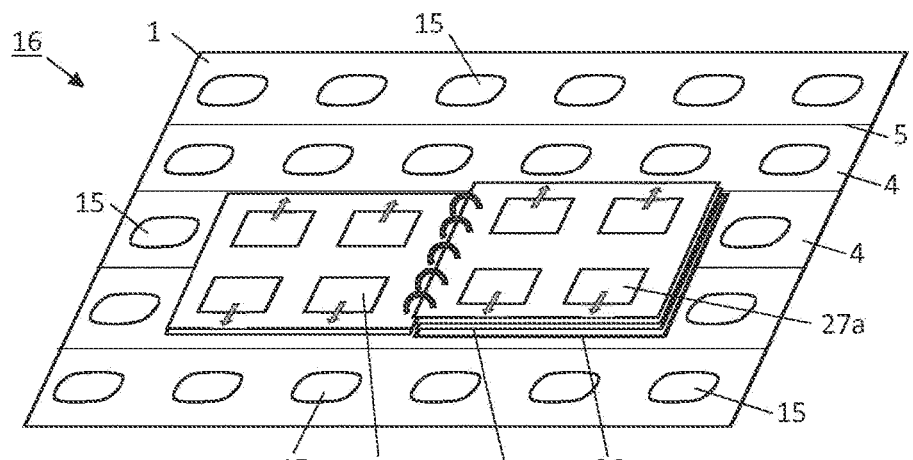
FIG. 9 shows a schematic view of an inventive smartbook on a smartboard.

In a further preferred embodiment a set 16 or a smartboard 1 includes an object 17 in form of a smartbook 25 as shown in FIG. 9. The prerequisite is that each NFC receiver 7 of the smartboard 1 has its own switch 15 assigned to it. A smartbook 25 includes a plate 26, the length of which extends across two or more array distances of switches 15 in the smartboard 1 and/or the width of which extends across two or more pockets 4. The plate 26 comprises a number of magnets 8 in form of ferromagnets or permanent magnets arranged in an array or grid as well as at least two RFID transponders 18 analogue to card 19 from FIG. 6. In addition a multi-page notebook 27 is attached to it, the pages of which are provided with instructions and choice variants 27a. Each of these variants 27a may have a switch 15 of the smartboard 1 assigned to it, which is arranged directly around the smartbook 25, if, when in use, it adheres to the smartboard 1. When actuating these switches 15 additional information is retrieved, which in turn may contain instructions. In addition a switch 15 may be defined, which is to be actuated when the page is completed. The page is then turned and the instructions of the next page are followed after further additional information has been retrieved.

Such smartbooks 25 may be manufactured for different workshops or projects and may guide the user or users through a process, for example through a decision process. The different aspects (price, quality, demand, risk etc.) may be respectively illuminated on a page and the variants, which are available to the users for selection, may be assigned to the surrounding switches 15 on the smartboard 1. The smartboard 1 recognises the position of the smartbook 25 with the aid of the two RFID transponders, which correspond with the NFC receivers on the smartboard 1. Here too all information, which is entered by the users on the smartboard through actuating the switches 15, is sent to the computer and processed further in there.

Moreover an inventive clipboard 28 as shown in FIG. 10A can be used alone or as an additional module with the smartboard 1 or with a named set 16. An inventive clipboard 28 consists of a base 29 with a fastening 29a for a sheet of paper 30 as depicted in FIG. 10B and is provided with at least one, preferably two RFID transponders 18. The sheet of paper 30 itself also includes one or two RFID transponders 18, wherein at least one RFID transponder 18 each of the base 29 and of the paper sheet 30 are arranged to be close to each other for communication, when the sheet of paper 30 is fixed to the fastening 29a. The base 29 comprises a marking 30a, which indicates where exactly the sheet of paper 30 is to be placed. The base 29 includes also a plurality of switches 15, preferably arranged in a matrix. They may be marked or arranged hidden behind a surface. As with the smartbook 25 the sheet of paper 30 may also be part of an accumulation of prefabricated sheets of paper 30. Each of these sheets 30 is provided with various information, instructions and choice variants 27a as well as with a number of marking fields 15a, which are respectively arranged at the locations of the switches 15 of the clipboard 28, when the sheet 30 is fastened at the marking 30a of the base 29. The user respectively actuates, depending on the situation, the corresponding switches 15 by for example pressing them. In FIG. 10B the marking fields 15a, which he can selectively actuate, are marked by circles arranged below the letters A, B and C. Further marking fields 15a are located where to the crosses are in the lower table. Depending on what is applicable the user actuates the corresponding switches 15 on the clipboard 28, by pressing on the marking fields 15a.

Preferably, every switch 15 is realised as a push button.

The clipboard 28 may additionally include a port 9, which may also be a wireless interface, with which the recorded data is transmitted to a computer 10.

The clipboard 28 may also include one or more LEDs 31 in order to give feedback for actions performed or in order to receive information. For example a lit LED 31 may indicate that information regarding a certain subject matter is displayed on a screen.

The set 16 including a smartboard 1 and an object 17, wherein the object is a card 19, a can 23, a connecting element 21 or a clipboard 28, is not marked as such in the figures. The objects 19, 21, 23 and 28 are merely shown on their own, without smartboard 1. Only the set 16 including a smartboard 1 and a smartbook 25 is depicted in FIG. 9. The object 28 according to the invention which was described here may according to the invention also be used on their own or in combination with other objects 17, 19, 21, 23, 25 and 28.

| List of reference symbols | |
|---|---|
| 1 | smartboard |
| 1a | eyelets |
| 2 | first surface; |
| 2a | felt mat |
| 3 | second surface; |
| 3a | plastic plate |
| 4 | pocket |
| 5 | joint |
| 6 | printplate |
| 6a | first printplate |
| 7 | NFC receiver |
| 8 | magnet, ferromagnet or permanent magnet |
| 9 | port |
| 9a | electrical connection |
| 10 | power supply, computer |
| 11 | roll |
| 12 | axis |
| 13 | recess |
| 14 | housing |
| 14a | housing part |
| 15 | switch, pressure switch |

-continued

List of reference symbols

| | |
|---|---|
| 15a | marking field for a switch |
| 16 | set |
| 17 | object |
| 18 | RFID transponder |
| 19 | card |
| 20 | coding, notch |
| 21 | connecting element |
| 22 | connecting ribbon |
| 23 | can |
| 24 | interior space |
| 25 | smartbook |
| 26 | plate |
| 27 | notebook |
| 27a | information, instructions, choice variants |
| 28 | clipboard |
| 29 | base |
| 29a | fastening |
| 30 | sheet of paper |
| 30a | marking for a sheet of paper |
| 31 | LED |

The invention claimed is:

1. A clipboard configured as a base for a sheet of paper and having a fastening therefor, wherein the base is provided with at least one RFID transponder and a marking indicating where the sheet of paper is to be placed on the base, as well as at least one sheet of paper having a RFID transponder, wherein the RFID transponder each of the base and of the sheet of paper are arranged so as to be close to each other for communication when the sheet of paper is fastened to the fastening, wherein the base includes a plurality of switches, which are arranged in a matrix, whereas the sheet of paper is provided with at least one of information, instructions, and choice variants as well as with a number of marking fields, which are respectively arranged corresponding to locations of the plurality of switches of the clipboard when the sheet is fastened on the marking of the base, wherein each switch of the plurality of switches is configured for activation by pressure applied thereto by a finger of a user of the clipboard.

2. The clipboard according to claim 1, further comprising at least one LED configured for indicating feedback for actions performed.

3. The clipboard according to claim 1, wherein the plurality of switches on the base are marked or arranged behind a surface.

4. The clipboard according to claim 1, further comprising a port configured for transmitting recorded data to a computer.

5. The clipboard according to claim 1, wherein the sheet of paper is part of an accumulation of prefabricated sheets of paper.

6. The clipboard according to claim 1, wherein each switch of the plurality of switches is configured as a push button.

7. The clipboard according to claim 4, wherein the port is a wireless interface.

8. A clipboard system for digitally collecting, storing, and evaluating input data provided by at least one user, the clipboard system comprising:
a clipboard having a base for a sheet of paper, a marker guiding placement of the sheet of paper on the clipboard, a fastener configured for fastening the sheet of paper to the clipboard, at least one RFID transponder, and a plurality of switches arranged in a matrix, each switch of the plurality of switches configured for actuation by pressure applied thereto by a finger of the at least one user; and
the sheet of paper fastened to the clipboard with the fastener, the sheet of paper having at least one RFID transponder configured for identification by the at least one RFID transponder of the clipboard, information informing the at least one user about a task or question, a plurality of choice variants listed, and a plurality of marking fields configured to inform the at least one user of a location to actuate in answer to each choice variant of the plurality of choice variants listed of the task or question,
wherein each switch of the plurality of switches corresponds to a marking field of the plurality of marking fields.

9. The clipboard system according to claim 8, further comprising at least one LED configured for indicating feedback for actuations performed.

10. The clipboard system according to claim 8, wherein the plurality of switches on the base of the clipboard are marked or arranged behind a surface.

11. The clipboard system according to claim 8, further comprising a port configured for transmitting data recorded during use of the clipboard system to a computer.

12. The clipboard system according to claim 11, wherein the port is a wireless interface.

13. The clipboard system according to claim 8, wherein the sheet of paper is part of an accumulation of prefabricated sheets of paper.

14. The clipboard system according to claim 8, wherein each switch of the plurality of switches is configured as a push button.

15. A clipboard system for digitally collecting, storing, and evaluating input data provided by at least one user, the clipboard system comprising:
a clipboard having a base for a sheet of paper, a marker guiding placement of the sheet of paper on the clipboard, a fastener configured for fastening the sheet of paper to the clipboard, at least one RFID transponder within the marker guiding placement, and a plurality of switches arranged in a matrix within the marker guiding placement, each switch of the plurality of switches configured as a push button for actuation by pressure applied thereto by a finger of the at least one user; and
the sheet of paper fastened to the clipboard with the fastener within the marker guiding placement, the sheet of paper having at least one RFID transponder configured for identification by the at least one RFID transponder of the clipboard, information informing the at least one user about a task or question, a list of choice variants given as a reply to the at least one user, and a plurality of marking fields, each related to one choice variant, configured to inform the at least one user of a location to actuate in answer to the task or question,
wherein each switch of the plurality of switches corresponds to a marking field of the plurality of marking fields.

16. The clipboard system according to claim 15, further comprising at least one LED configured for indicating feedback for actuations performed.

17. The clipboard system according to claim 15, wherein the plurality of switches on the base of the clipboard are marked or arranged behind a surface.

18. The clipboard system according to claim 15, further comprising a port configured for transmitting data recorded during use of the clipboard system to a computer.

19. The clipboard system according to claim 18, wherein the port is a wireless interface.

20. The clipboard system according to claim 15, wherein the sheet of paper is part of an accumulation of prefabricated sheets of paper.

\* \* \* \* \*